United States Patent
Dmytriw et al.

(10) Patent No.: US 8,175,835 B2
(45) Date of Patent: *May 8, 2012

(54) FLOW SENSOR WITH CONDITIONING-COEFFICIENT MEMORY

(75) Inventors: Anthony M. Dmytriw, Dublin, OH (US); Lamar F. Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 1095 days.

This patent is subject to a terminal disclaimer.

(21) Appl. No.: 11/383,834

(22) Filed: May 17, 2006

(65) Prior Publication Data

US 2007/0271070 A1 Nov. 22, 2007

(51) Int. Cl.
*G01F 1/12* (2006.01)
*G06F 11/00* (2006.01)

(52) U.S. Cl. ......... 702/100; 702/181; 702/188; 702/190

(58) Field of Classification Search .......... 702/100–107, 702/181–190, 121–123
See application file for complete search history.

(56) References Cited

U.S. PATENT DOCUMENTS

| | | |
|---|---|---|
| 3,410,287 A | 11/1968 | Van Der Heyden et al. |
| 4,090,215 A | 5/1978 | Buchan et al. |
| 4,303,984 A | 12/1981 | Houvig |
| 4,337,658 A | 7/1982 | Motchenbacher et al. |
| 4,341,107 A | 7/1982 | Blair et al. |
| 4,494,183 A | 1/1985 | Bayer et al. |
| 4,668,102 A | 5/1987 | Mott |
| 4,845,649 A | 7/1989 | Eckardt et al. |
| 4,907,449 A | 3/1990 | Call et al. |
| 5,000,478 A | 3/1991 | Kerastas |
| 5,012,667 A | 5/1991 | Kruse |
| 5,038,305 A | 8/1991 | Kumar et al. |
| 5,050,429 A | 9/1991 | Nishimoto et al. |
| 5,089,979 A | 2/1992 | McEachern et al. |
| 5,184,107 A | 2/1993 | Maurer |
| 5,251,157 A | 10/1993 | Prather |
| 5,303,167 A * | 4/1994 | Bonne ............................ 702/50 |
| 5,321,638 A | 6/1994 | Witney |
| 5,329,818 A | 7/1994 | Frick et al. |
| 5,365,768 A | 11/1994 | Suzuki et al. |
| 5,365,784 A | 11/1994 | Morrissey |

(Continued)

FOREIGN PATENT DOCUMENTS

DE 3446248 6/1986

(Continued)

OTHER PUBLICATIONS http://ieee1451.nist.gov/tedssen.html, "TEDS," 2 pages, prior to May 17, 2006.

(Continued)

*Primary Examiner* — Phuong Huynh
(74) *Attorney, Agent, or Firm* — Honeywell International Inc.

(57) ABSTRACT

A sensor includes one or more sensor transducers coupled with a signal conditioning IC incorporating signal conditioning circuitry and memory devoted to storing end-user downloadable coefficients. In a preferred embodiment, the IC is an ASIC and the end-user downloadable coefficients are preselected by the end-user based on its needs, and the coefficients are pre-stored in the ASIC when the sensor is calibrated. This results in a more cost-effective and space-efficient sensor device with improved functionality over that available in the prior art.

25 Claims, 2 Drawing Sheets

U.S. PATENT DOCUMENTS

| | | | |
|---|---|---|---|
| 5,410,916 A | 5/1995 | Cook | |
| 5,459,351 A | 10/1995 | Bender | |
| 5,479,096 A | 12/1995 | Szczyrbak et al. | |
| 5,631,417 A | 5/1997 | Harrington et al. | |
| 5,735,267 A | 4/1998 | Tobia | |
| 5,808,210 A | 9/1998 | Herb et al. | |
| 5,827,960 A | 10/1998 | Sultan et al. | |
| 5,892,145 A | 4/1999 | Moon et al. | |
| 5,946,641 A | 8/1999 | Morys | |
| 6,032,109 A | 2/2000 | Ritmiller, III | |
| 6,035,721 A | 3/2000 | Krisch | |
| 6,053,031 A | 4/2000 | Kullik et al. | |
| 6,181,574 B1 | 1/2001 | Loibl | |
| 6,243,654 B1 * | 6/2001 | Johnson et al. | 702/85 |
| 6,321,171 B1 | 11/2001 | Baker | |
| 6,543,449 B1 | 4/2003 | Woodring et al. | |
| 6,591,674 B2 | 7/2003 | Gehman et al. | |
| 6,595,049 B1 | 7/2003 | Maginnis, Jr. et al. | |
| 6,655,207 B1 | 12/2003 | Speldrich et al. | |
| 6,681,623 B2 | 1/2004 | Bonne et al. | |
| 6,681,625 B1 * | 1/2004 | Berkcan et al. | 73/204.23 |
| 6,684,695 B1 | 2/2004 | Fralick et al. | |
| 6,687,642 B2 | 2/2004 | Maher et al. | |
| 6,701,274 B1 * | 3/2004 | Eryurek et al. | 702/140 |
| 6,724,612 B2 | 4/2004 | Davis et al. | |
| 6,725,731 B2 | 4/2004 | Wiklund et al. | |
| 6,761,165 B2 | 7/2004 | Strickland, Jr. | |
| 6,769,285 B2 | 8/2004 | Schneider et al. | |
| 6,805,003 B2 | 10/2004 | Ueki et al. | |
| 6,820,481 B1 | 11/2004 | Weber et al. | |
| 6,823,711 B1 | 11/2004 | Chen et al. | |
| 6,867,602 B2 | 3/2005 | Davis et al. | |
| 6,871,537 B1 | 3/2005 | Gehman et al. | |
| 6,904,799 B2 | 6/2005 | Cohen et al. | |
| 6,904,907 B2 | 6/2005 | Speldrich et al. | |
| 6,911,894 B2 | 6/2005 | Bonne et al. | |
| 6,912,918 B1 | 7/2005 | Lynnworth et al. | |
| 6,923,069 B1 | 8/2005 | Stewart | |
| 6,929,031 B2 | 8/2005 | Ford et al. | |
| 6,945,118 B2 | 9/2005 | Maitland, Jr. et al. | |
| 6,949,928 B2 | 9/2005 | Gonzalez Ballester et al. | |
| 6,958,565 B1 | 10/2005 | Liu | |
| 6,958,689 B2 | 10/2005 | Anderson et al. | |
| 6,989,433 B2 | 1/2006 | Wong et al. | |
| 7,000,612 B2 | 2/2006 | Jafari et al. | |
| 7,016,792 B2 | 3/2006 | Schneider | |
| 7,024,937 B2 | 4/2006 | James | |
| 7,060,197 B2 | 6/2006 | Fuertsch et al. | |
| 7,061,325 B2 | 6/2006 | Pitz | |
| 7,073,392 B2 | 7/2006 | Lull et al. | |
| 7,077,004 B2 | 7/2006 | Mitter | |
| 7,084,378 B2 | 8/2006 | Griffin et al. | |
| 7,107,835 B2 | 9/2006 | Korniyenko et al. | |
| 7,159,457 B2 | 1/2007 | Wildgen | |
| 7,162,927 B1 | 1/2007 | Selvan et al. | |
| 7,193,498 B2 | 3/2007 | Kawamoto et al. | |
| 7,210,346 B1 | 5/2007 | Hoover et al. | |
| 7,233,845 B2 | 6/2007 | Veinotte | |
| 7,243,541 B1 | 7/2007 | Bey et al. | |
| 7,258,003 B2 | 8/2007 | Padmanabhan et al. | |
| 7,260,994 B2 | 8/2007 | Oboodi et al. | |
| 7,266,999 B2 | 9/2007 | Ricks | |
| 7,277,802 B1 * | 10/2007 | Dmytriw | 702/50 |
| 7,278,309 B2 | 10/2007 | Dmytriw et al. | |
| 7,280,927 B1 * | 10/2007 | Dmytriw | 702/45 |
| 7,318,351 B2 | 1/2008 | Cobianu et al. | |
| 7,331,239 B1 | 2/2008 | Wang et al. | |
| 7,343,823 B2 | 3/2008 | Speldrich | |
| 7,373,819 B2 | 5/2008 | Engler et al. | |
| 7,430,918 B2 | 10/2008 | Selvan et al. | |
| 7,467,547 B2 | 12/2008 | Oda et al. | |
| 7,493,823 B2 | 2/2009 | Stewart et al. | |
| 7,520,051 B2 | 4/2009 | Becke et al. | |
| 7,520,184 B2 | 4/2009 | Uemura et al. | |
| 7,597,005 B2 | 10/2009 | McMonigal | |
| 7,634,437 B1 | 12/2009 | Tanpoco | |
| 7,635,077 B2 | 12/2009 | Schubert | |
| 7,635,091 B2 | 12/2009 | Engler et al. | |
| 7,710,128 B2 | 5/2010 | Alimi et al. | |
| 7,769,557 B2 | 8/2010 | Bey et al. | |
| 7,829,982 B2 | 11/2010 | Shirasaka et al. | |
| 7,832,269 B2 | 11/2010 | Bey, Jr. et al. | |
| 7,927,010 B2 | 4/2011 | Schick et al. | |
| 7,934,411 B2 | 5/2011 | Koch | |
| 8,010,322 B2 * | 8/2011 | Dmytriw et al. | 702/189 |
| 2003/0062045 A1 | 4/2003 | Woodring et al. | |
| 2003/0171882 A1 | 9/2003 | Thielman et al. | |
| 2005/0016534 A1 | 1/2005 | Ost | |
| 2005/0247106 A1 | 11/2005 | Speldrich et al. | |
| 2006/0082363 A1 * | 4/2006 | Ricks et al. | 324/207.21 |
| 2006/0089813 A1 | 4/2006 | Mushirahad et al. | |
| 2006/0201247 A1 | 9/2006 | Speldrich et al. | |
| 2007/0197922 A1 | 8/2007 | Bradley et al. | |
| 2007/0209433 A1 | 9/2007 | Gehman et al. | |
| 2007/0271069 A1 | 11/2007 | Dmytriw et al. | |
| 2007/0295082 A1 | 12/2007 | Kilian | |
| 2008/0236273 A1 | 10/2008 | Dmytriw et al. | |
| 2009/0288484 A1 | 11/2009 | Selvan et al. | |
| 2010/0268485 A1 * | 10/2010 | Bey et al. | 702/45 |

FOREIGN PATENT DOCUMENTS

| | | |
|---|---|---|
| DE | 3803104 | 8/1989 |
| EP | 0574288 | 8/1997 |
| EP | 0892249 A1 | 1/1999 |
| EP | 2184589 | 5/2010 |
| GB | 2065890 A | 7/1981 |
| JP | 2001174304 | 6/2001 |
| KR | 2005/007225 * | 7/2005 |
| KR | 20050075225 | 7/2005 |
| WO | WO 94/12940 A1 | 6/1994 |
| WO | WO 00/34744 A1 | 6/2000 |

OTHER PUBLICATIONS http://ieee1451.nist.gov/metateds.html, "Below is an Example of a Meta TEDS," 2 pages, prior to May 17, 2006.

http://ieee1451.nist.gov/chanteds.html, "Below is an Example of a Channel TEDS," 1 page, prior to May 17, 2006.

http://ieee1451.nist.govicalibteds.html, "Below is an Example of a Calibration TEDS," 1 page, prior to May 17, 2006.

http://ieee1451.nist.gov/correc.html, "Correction (By Use of Data in a Calibration TEDS)," 1 page, prior to May 17, 2006.

http://web.archive.org/web/20060317003924, "Sensors (Including IEEE-P1451.4 Plug-and-Play Sensors) Overview," Maxim Integrated Products, 2 pages, copyright 2006.

http://web.archive.org/web/20060322155856, "Pressure Sensors," Maxim, 4 pages prior to May 17, 2006.

http://web.archive.org/web/20050906233240, "MAX 1457," Maxim, 3 pages, prior to May 17, 2006.

http://web.archive.org/web/20050906123256, "MAX 1452 Low-Cost, Precision Sensor Signal Conditioner," Maxim, 3 pages, prior to May 17, 2006.

http://web.archive.org/web/20050831115252, "MAX 1455 Low-Cost Automotive Sensor Signal Conditioner," Maxim, 3 pages, prior to May 17, 2006.

http://web.archive.org/web/20050407175641, "MAX 1463 Low-Power, Two Channel Sensor Signal Processor," Maxim 2 pages, prior to May 17, 2006.

http://web.archive.org/web/20060322155905, "Temperature Sensors," Maxim, 7 pages, prior to May 17, 2006.

Maxim, "MAX 1464 Low-Power, Low-Noise Multichannel Sensor Signal Processor," 47 pages, revised Feb. 2005.

Maxim, "MAX 1463 Low-Power, Two-Channel Signal Processor," 50 pages, Nov. 2004.

http://web.archive.org/web/20060322160322160032, "Sample and Infinite Hold (for Calibration)," 2 pages, Copyright 2006.

http://web.archive.org/web/20060322174055, "DS4305 Sample-and-Infinite-Hold Voltage Reference," Maxim, 3 pages prior to May 17, 2006.

http://web.archive.org/web/20060114014946, "DS4303, DS4303K, Voltage Sample and Infinite Hold," 3 pages prior to May 17, 2006.

ElectroSonic, "Product Catalog," pp. 29-30, Jan. 2007.

Fan et al., "Design and Fabrication of Artificial Lateral Line Flow Sensors," Institute of Physics Publishint, Journal of Micromechanics and Microentineerint, vol. 12, pp. 655-661, 2002.

Honeywell, "HIH-4030/31 Series Humidity Sensors," Mar. 2008.

Honeywell, "Honeywell Introduces the FS300-100 Combi-Sensor for Boiler Systems," Jun. 11, 2004.

Honeywell, "Installation Instructions for the HIH-4030/31 Humidity Sensors," Issue 2, 50022701, 4 pages, Aug. 2007.

Honeywell, "Interactive Catalog Replaces Catalog Pages, 22/24/26PC Series" pp. 17-20, prior to May 9, 2011.

Honeywell, "Interactive Catalog Replaces Catalog Pages, 40PC Series," pp. 31-33, prior to May 9, 2011.

Honeywell, "Microstructure Pressure Sensors 0 psi to 1 psi through 0 psi to 100 psi, ASDX DO Series," 6 pages, 2005.

Honeywell, "ZMD Heimdal Combi-Sensor ASIC," 15 pages, Nov. 23, 2006.

U.S. Appl. No. 13/103,891, filed May 9, 2011.

US 7,021,135, 04/2006, Korniyenko et al. (withdrawn)

* cited by examiner

_US 8,175,835 B2_

FLOW SENSOR WITH CONDITIONING-COEFFICIENT MEMORY

FIELD OF THE INVENTION

This invention relates to the field of sensors and, more particularly, to sensors incorporating conditioning circuitry for conditioning of sensed signals.

BACKGROUND OF THE INVENTION

A transducer is a device that converts one type of energy into another type of energy for the purpose of measurement or information transfer. A sensor transducer is a type of transducer that detects (senses) a signal or physical condition and converts it to a signal that can be read and analyzed by humans. Examples of devices that use sensor transducers include mass airflow sensors, speed sensors, position sensors, pressure sensors, relative humidity sensors, and the like.

In certain situations a combination sensor or "combi-sensor" is used to measure multiple signals or physical conditions using a single sensor device. Combi-sensors often incorporate one or more sensor transducers that measure flow (e.g., air-flow, water-flow, etc.). Flow sensors can have highly non-linear outputs because their output is dependent upon many factors such as the temperature coefficients of the resistance of the sensing element, thermal transfer characteristics of the media being measured and the media of the transducer, and the mechanical dimensions of the flow path.

As is well known, the output of a sensor transducer, referred to herein as a "raw signal", must be conditioned so that it can be properly used by an end-user. Signal conditioning circuits and conditioning techniques (also referred to as "signal compensation" or "signal correction") condition raw signals from sensor transducers, regardless of the quantity being measured by the sensor transducer or the sensor transducer technologies. When a combi-sensor includes a flow-sensor, the high level of non-linearity of the output requires that the conditioning scheme also be highly non-linear. Other factors, such as the ambient temperature around the sensors and the sensitivity of the various sensing technologies can also affect the linearity and stability of the signal output from a sensor transducer, further adding to the need to provide non-linear conditioning capability for the output signal.

Application Specific Integrated Circuits (ASICs) have been developed for conditioning sensor transducer signals, and these ASICs offer a wide variety of programming options that can be specifically tailored to match the characteristics of the particular sensor technology. Because there are so many different types of sensors on the market (pressure, airflow, speed, position, etc.), it is practically impossible to design an affordable ASIC capable of conditioning the raw signals output from every type of transducer. However, in most cases raw signals need to be conditioned for similar characteristics (sensitivity, offset, temperature induced sensitivity changes, temperature induced offset changes and non-linear characteristics) and thus generic conditioning circuits with the ability to "coarsely" condition raw signals for these basic characteristics have been developed. Coarse conditioning as used herein refers to conditioning of a signal using lower order polynomial expressions, e.g., $2^{nd}$ order polynomial expressions or lower. Typical conditions for which coarse conditioning would be appropriate include compensating a signal for sensitivity changes due to temperature or signal offset changes due to temperature.

Currently, sensor manufacturers are using two methods to condition raw signals output from the sensor transducers of a combi-sensor and deliver them to the user, each of which is advantageous in its own way. In a first method, a signal conditioning ASIC includes a conditioning circuit capable of coarsely conditioning the raw signal and delivers this coarsely-conditioned signal to the end-user. Since the basic level of conditioning is provided by the ASIC, the end-user need not provide or use its own processors to perform conditioning, thereby freeing them up for other tasks. A drawback, as described above, is that the robustness of the conditioning is limited in favor of having a signal conditioning chip that can be used in a wide variety of applications. This technique is adequate for fairly linear outputs but is inadequate for the non-linear outputs of flow sensors and combi-sensors employing flow sensors.

A second method is to provide the end-user with downloadable compensation coefficients that are applied to conditioning equations processed by the processor(s) of the end-user device receiving a raw signal from a sensor. In practice, memory such as a TEDS (Transducer Electronic Data Sheet) IC stores downloadable coefficients that can be used in applications such as signal conditioning applications. A sensor transducer outputs a raw signal to the end-user device, and the optimal coefficients that have been downloaded from the memory are used by a processor in the end-user's system to apply to equations that perform the desired conditioning. Using downloadable coefficients from a memory location gives an end-user the flexibility to, when needed, use higher order (e.g., $3^{rd}$ order polynomial expressions or greater) exponential functions to condition the raw transducer signals, instead of having to use the more generic conditioning coefficients provided by the signal-conditioning ASIC described above. However, since the end-user performs the conditioning process on the raw signal coming directly from the sensor transducer, the end-user must tie up its processors for conditioning purposes.

It would be desirable to have a flow sensor and/or combi-sensor that incorporates an integrated circuit that can be customized to the needs of a particular end-user and provide to the end-user both a coarsely-conditioned signal to the end-user and downloadable coefficients needed to provide high level conditioning when needed.

SUMMARY OF THE INVENTION

In accordance with the present invention, a flow sensor and/or combi-sensor includes an integrated signal conditioning IC incorporating both signal conditioning circuitry and memory devoted to storing end-user downloadable coefficients. In a preferred embodiment, the end-user downloadable coefficients are pre-selected by the end-user based on its needs, and the coefficients are pre-stored in the ASIC when the sensor device is calibrated. This results in a more cost-effective and space-efficient combi-sensor device with improved functionality over that available in the prior art.

DETAILED DESCRIPTION OF THE INVENTION

Figure 1:
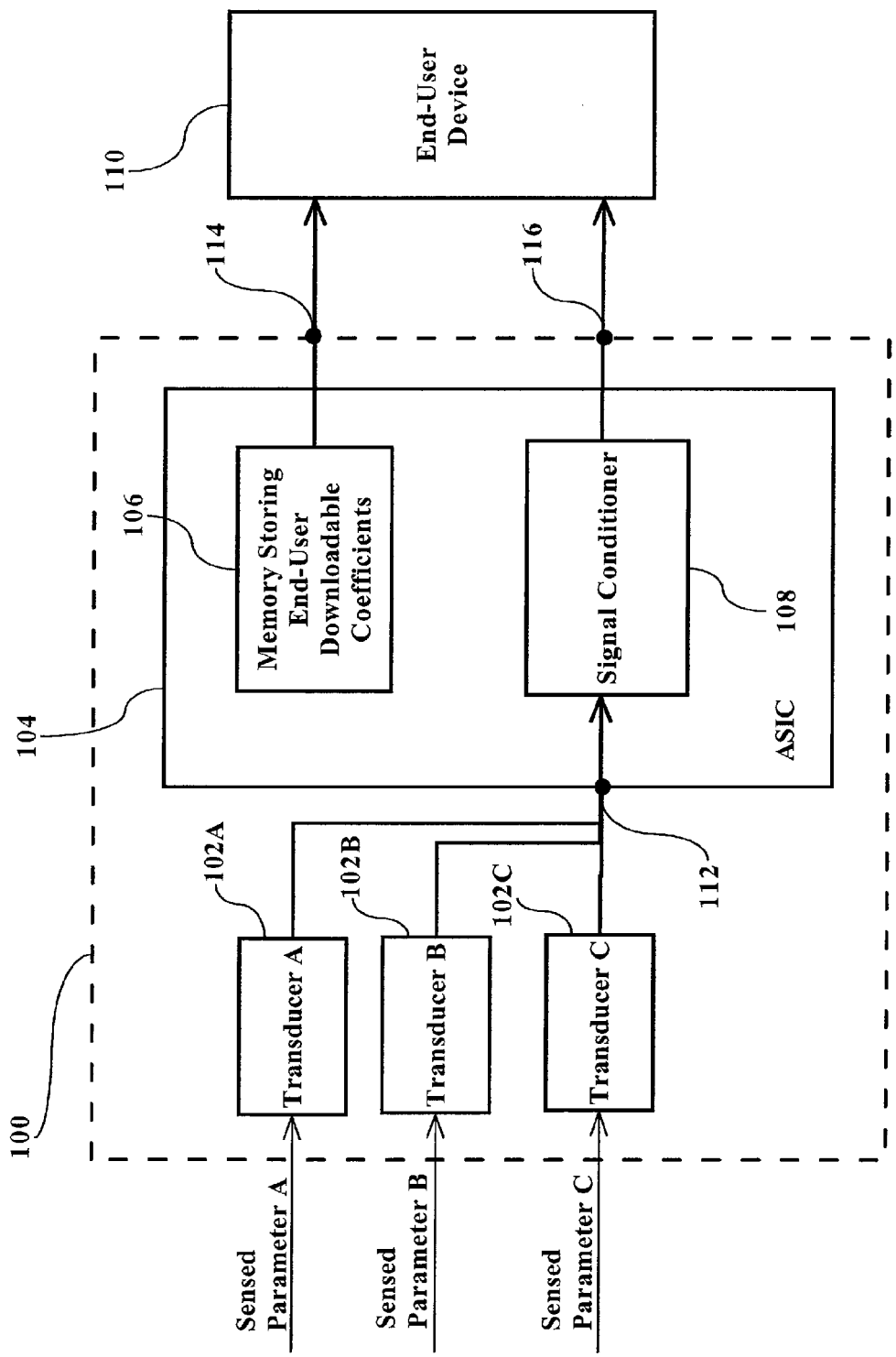
FIG. 1 is a block diagram illustrating the basic structure and concept of the present invention.

FIG. 1 is a block diagram illustrating the basic structure and concept of a preferred embodiment of the present invention. Referring to FIG. 1, a sensor 100 includes multiple sensor transducers 102A, 102B, and 102C each outputting a raw signal to an input 112 of a signal conditioner 108 of an ASIC 104. Although three sensor transducers are illustrated in FIG. 1, it is understood that any number of transducers can be utilized and still fall within the scope of the claimed invention. The raw signals correspond to a parameter sensed by sensor transducer 102A, 102B, and/or 102C. Signal conditioner 108 conditions the raw signals from sensor transducers 102A, 102B, and 102C in a well-known manner, using lower-order polynomial expressions (e.g., $2^{nd}$ order or lower) to produce a coarsely-conditioned signal which is output, in this example, to end-user device 110 via an output 116.

Sensor transducers 102A, 102B, and 102C can each be any kind of sensor transducer, for example, sensor 102A can be a mass airflow sensor, sensor 102B can be a speed sensor, and sensor 102C can be a pressure sensor. The present invention is particularly useful where at least one of the sensor-transducers is sensing a parameter that results in a highly non-linear output, such as a sensor transducer that is sensing the flow of a fluid.

End-user device 110 can comprise, for example, a microprocessor used by the end-user to analyze, store, and otherwise use the data coming from sensors 102A, 102B, and 102C. The microprocessor may be dedicated for that purpose; more typically the microprocessor will be part of a larger processing device that uses the analyzed data for some other purpose, e.g., a patient monitor used for monitoring the breathing, temperature, and heart rate of a hospital patient.

ASIC 104 is situated between sensor transducers 102A, 102B, and 102C and end-user device 110. ASIC 104 is equipped with memory 106. This memory 106 stores specific coefficients downloadable to the end-user device 110 by the end-user via an output 114 to perform particular tasks. For example, the end-user may have use for the coarsely conditioned signals from signal conditioner 108 for a certain application, but also have a need for a more linearized signal resulting from the conditioning of the coarsely conditioned signals using a predetermined equation and sensor-specific sinusoidal Fourier coefficients. In accordance with the present invention, when the sensor 100 is provided to the end-user, memory 106 has these Fourier coefficients specific to needs of that particular end-user stored and available for the end-user to download.

Thus, the end-user can take sensor 100, connect it to their end-user device 110, and download the downloadable coefficients from memory 106, before receiving sensed signals from sensor 100. This configures the end-user device 110 to both receive the coarsely compensated signals from signal conditioner 108, and gives them the ability to apply the predetermined equations downloaded from memory 106 to the coarsely compensated signal and compensate it even further to achieve a more accurate, highly compensated signal. This second level of compensation, performed using the downloadable coefficients, is referred to herein as "fine conditioning" and means conditioning the signal using polynomial expressions of an order higher than those used for coarse conditioning, e.g., $3^{rd}$ order polynomial expressions or greater.

In the drawing of FIG. 1, the sensor transducers 102A, 102B, 102C and ASIC 104 are illustrated as being integrated into sensor 100; however, it is understood that sensor transducers 102A-102C and ASIC 104 can be separate (non-integrated) components and such a non-integrated configuration falls within the scope of the invention claimed herein. Further, in the preferred embodiment the memory 106 and signal conditioner 108 are configured in an ASIC; however, it is understood that the memory 106 and signal conditioner 108 can also be configured in a general purpose integrated circuit and such a configuration falls within the scope of the invention claimed herein.

Although memory 106 could include a set of generic coefficients that could be usable by any end-user, in the preferred embodiment, memory 106 is preconfigured, prior to delivery for use by the end-user, with only the specific coefficients needed for application to the conditioning equation(s) being used by the end-user. In a preferred embodiment, the memory comprises EEPROM. The process of loading a memory with coefficients is a known process and is not described further herein. Further, while in the examples above the "lower order" polynomial expressions are described as being $2^{nd}$ order or lower and the higher level of conditioning is described as being performed using $3^{rd}$ order or higher polynomial expressions, these values are given for the purpose of example only. Of relevance to the present invention is that a first level of conditioning is performed by the signal conditioning circuitry on board the IC, and a second level of conditioning is performed by the end-user device using the downloadable coefficients stored in the memory of the IC.

Figure 2:
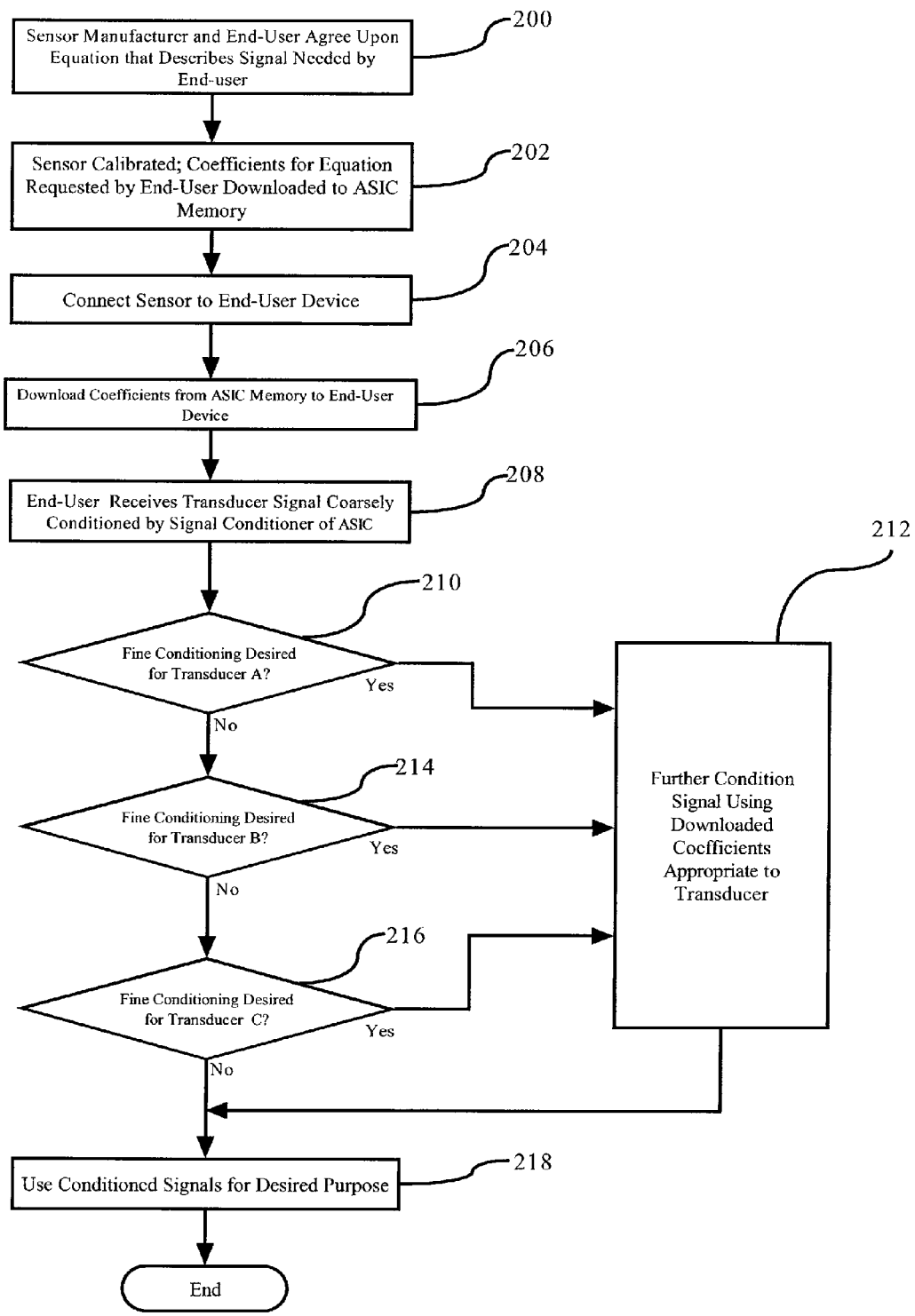
FIG. 2 is a flowchart illustrating steps performed in accordance with the present invention.

FIG. 2 is a flowchart illustrating steps performed in accordance with the present invention. At step 200, the sensor manufacturer/supplier and the end-user agree upon one or more conditioning equations that will be used to finely condition the coarsely-conditioned signal received from sensor 100. The equation will differ, for example, depending on the linearity or non-linearity of the raw signals output by the sensor.

At step 202, the sensor is calibrated, and coefficients for the equation(s) being used by the end-user are downloaded to the ASIC memory. Preferably, the coefficients for the equation(s) requested by the end-user are installed at the factory at the same time that the sensor is tested during calibration. Alternatively, the coefficients could be stored during a post-manufacture process prior to delivery to the end-user.

At step 204, the sensor 100 is connected to the end-user device. At step 206, upon connection to the end-user device, the coefficients from the ASIC memory are downloaded to the end-user device so that they are available for use. If desired, this step can be deferred until the coefficients are actually needed. At step 208, the end-user device receives coarsely-conditioned signals from signal conditioner 108 of sensor 100.

At step 210, a determination is made as to whether or not fine conditioning is desired for the raw signal output from sensor transducer 102A. If fine conditioning is desired, the process proceeds to step 212, where further conditioning is performed on the raw signals from sensor transducer 102A using the downloaded coefficients and the appropriate equation, and then the process proceeds to step 218, where the fine-conditioned signal from sensor transducer 102A is used for its intended purpose.

If at step 210 it is determined that fine conditioning is not desired for a raw signal coming from sensor transducer 102A, then at step 214 a determination is made as to whether or not fine conditioning is desired for the raw signal output from sensor transducer 102B. If fine conditioning is desired, the process proceeds to step 212, where further conditioning is performed on the raw signals from sensor transducer 102B using the downloaded coefficients and the appropriate equation, and then the process proceeds to step 218, where the fine-conditioned signal from sensor transducer 102B is used for its intended purpose.

If at step 214 it is determined that fine conditioning is not desired for a raw signal coming from sensor transducer 102B, then at step 216 a determination is made as to whether or not fine conditioning is desired for the raw signal output from sensor transducer 102C. If fine conditioning is desired, the process proceeds to step 212, where further conditioning is performed on the raw signals from sensor transducer 102C using the downloaded coefficients and the appropriate equation, and then the process proceeds to step 218, where the fine-conditioned signal from sensor transducer 102C is used for its intended purpose.

If at step 216 it is determined that fine conditioning is not desired for a raw signal coming from sensor transducer 102C, the process proceeds directly to step 214 and the coarsely-conditioned signal is used for its desired purpose.

By incorporating the ability to have downloadable coefficients pre-loaded into a sensor delivered to an end-user, the sensor manufacturer can deliver a highly accurate sensor that can still be used in numerous settings. This, in turn, keeps the overall sensor cost down which is a positive result for both the manufacturer and end-user.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A sensor apparatus comprising:
a first sensor transducer sensing a first parameter and outputting a first raw signal corresponding to said sensed first parameter;
signal-conditioning circuitry receiving said first raw signal output from said first sensor transducer, performing a coarse-correction on said first raw signal to produce a first coarsely-conditioned signal, and outputting said first coarsely-conditioned signal via a first sensor output; and
a storage location storing predetermined sensor-specific correction coefficients, said stored predetermined sensor-specific correction coefficients being provided to a second sensor output such that an end-user device, when coupled to the first and second sensor outputs, performs a fine-correction on said first coarsely-conditioned signal output from said signal-conditioning circuitry.

2. The sensor apparatus of claim 1, further comprising:
a second sensor transducer sensing a second parameter and outputting a second raw signal corresponding to said sensed second parameter;
wherein said signal-conditioning circuitry receives said second raw signal output from said second sensor transducer, performs a coarse-correction on said second raw signal to produce a second coarsely-conditioned signal, and outputs said second coarsely-conditioned signal via said first sensor output.

3. The sensor apparatus of claim 1, wherein:
said signal-conditioning circuitry and said storage location are coupleable to the end-user device;
when said signal conditioning circuitry and said storage location are coupled to the end-user device, said end-user device receives said first coarsely-conditioned signal from said first sensor output and said stored predetermined sensor-specific correction coefficients from said second sensor output; and
said end-user device performs said fine-correction on said first coarsely-conditioned signal using said stored correction coefficients.

4. The sensor apparatus of claim 2, wherein:
said signal-conditioning circuitry and said storage location are coupleable to the end-user device;
when said signal conditioning circuitry and said storage location are coupled to the end-user device, said end-user device receives said first coarsely-conditioned signal and said second coarsely-conditioned signal from said first sensor output and said stored predetermined sensor-specific correction coefficients from said second sensor output; and
said end-user device performs said fine-correction on said first coarsely-conditioned signal and/or said second coarsely-conditioned signal using said stored predetermined sensor-specific correction coefficients.

5. The sensor apparatus of claim 1, wherein said stored predetermined sensor-specific correction coefficients are pre-selected based on requirements provided by an end-user of said sensor apparatus.

6. The sensor apparatus of claim 2, wherein said stored predetermined sensor-specific correction coefficients are pre-selected based on requirements provided by an end-user of said sensor apparatus.

7. The sensor apparatus of claim 1, wherein said signal conditioning circuitry and said storage location are configured as an ASIC.

8. The sensor apparatus of claim 2, wherein said signal conditioning circuitry and said storage location are configured as an ASIC.

9. The sensor device of claim 1, wherein said storage location comprises an EEPROM.

10. The sensor device of claim 2, wherein said storage location comprises an EEPROM.

11. The sensor device of claim 1, wherein said first sensor transducer comprises a flow sensor-transducer.

12. A method of conditioning a sensor signal, comprising:
configuring a first sensor transducer to sense a first parameter and output a first raw signal corresponding to said sensed first parameter;
configuring a signal-conditioning circuit to receive said first raw signal output from said first sensor transducer, perform a coarse-correction on said first raw signal to produce a first coarsely-conditioned signal, and output said first coarsely-conditioned signal via a first sensor output;
configuring a storage location to store predetermined sensor-specific correction coefficients; and
outputting the stored predetermined sensor-specific correction coefficients to a second sensor output such that an end-user device, when coupled to the first and second sensor outputs, performs a fine-correction on said first coarsely-conditioned signal output from said signal-conditioning circuitry.

13. The method of claim 12, further comprising:
configuring a second sensor transducer to sense a second parameter and output a second raw signal corresponding to said sensed second parameter;
configuring said signal-conditioning circuitry to receive said second raw signal output from said second sensor transducer, perform a coarse-correction on said second raw signal to produce a second coarsely-conditioned signal, and output said second coarsely-conditioned signal via said first sensor output.

14. The method of claim 12, wherein said signal-conditioning circuitry and said storage location are coupleable to the end-user device, said method further comprising:
when said signal conditioning circuitry and said storage location are coupled to the end-user device, outputting to said end-user device said first coarsely-conditioned signal from said first sensor output and said stored predetermined sensor-specific correction coefficients from said second sensor output; and
performing, using said end-use device, said fine-correction on said first coarsely-conditioned signal using said stored predetermined sensor-specific correction coefficients.

15. The method of claim 13, wherein said signal-conditioning circuitry and said storage location are coupleable to the end-user device, said method further comprising:
when said signal conditioning circuitry and said storage location are coupled to the end-user device, outputting to said end-user device said first coarsely-conditioned signal and said second coarsely-conditioned signal from said first sensor output and said stored predetermined sensor-specific correction coefficients from said second sensor output; and
performing, using said end-user device, said fine-correction on said first coarsely-conditioned signal and/or said second coarsely-conditioned signal using said stored predetermined sensor-specific correction coefficients.

16. The method of claim 12, wherein said signal conditioning circuitry and said storage location are configured as an ASIC.

17. The method of claim 13, wherein said signal conditioning circuitry and said storage location are configured as an ASIC.

18. The method of claim 12, wherein said storage location comprises an EEPROM.

19. The method of claim 13, wherein said storage location comprises an EEPROM.

20. The method of claim 12, wherein said first sensor transducer comprises a flow sensor-transducer.

21. A sensor apparatus comprising:
a plurality of sensor transducers, each sensing a parameter and outputting a raw signal corresponding to it respective sensed parameter;
signal-conditioning circuitry receiving said each raw signal output from said plurality of sensor transducers, performing a coarse-correction on each of said raw signals to produce a coarsely-conditioned signal corresponding to each raw signal, and outputting each coarsely-conditioned signal via a first sensor output; and
a storage location storing predetermined sensor-specific correction coefficients, said stored predetermined sensor-specific correction coefficients being provided to a second sensor output such that an end-user device, when coupled to the first and second sensor outputs, performs a fine-correction on each coarsely-conditioned signal output from said signal-conditioning circuitry.

22. A sensor apparatus comprising:
a first sensor transducer sensing a first parameter and outputting a first raw signal corresponding to said sensed first parameter;
signal conditioning circuitry configured to receive said first raw signal that is output from said first sensor transducer, perform a first correction on said first raw signal to produce a first conditioned signal, and output said first conditioned signal via a first sensor output;
a storage location configured to store predetermined sensor specific correction coefficients, said stored predetermined sensor specific correction coefficients being provided to a second sensor output such that an end-user device, when coupled to the first and second sensor outputs, performs a second correction on said first conditioned signal that is output from said signal conditioning circuitry;
a second sensor transducer configured to sense a second parameter and output a second raw signal corresponding to said sensed second parameter; and
wherein said signal conditioning circuitry is configured to receive said second raw signal output from said second sensor transducer, perform a third correction on said second raw signal to produce a third conditioned signal, and output said third conditioned signal via said first sensor output.

23. The sensor apparatus of claim 22, wherein said storage location is configured to store the predetermined sensor specific correction coefficients for use in performing a fourth correction on said third conditioned signal that is output from said signal conditioning circuitry.

24. A The sensor apparatus of claim 22, wherein comprising: a first sensor transducer sensing a first parameter and outputting a first raw signal corresponding to said sensed first parameter;
signal conditioning circuitry configured to receive said first raw signal that is output from said first sensor transducer, perform a first correction on said first raw signal to produce a first conditioned signal, and output said first conditioned signal via a first sensor output;

a storage location configured to store predetermined sensor specific correction coefficients for use in performing a second correction on said first conditioned signal that is output from said signal conditioning circuitry;

said signal conditioning circuitry and said storage location are coupleable to an end-user device;

wherein when said signal conditioning circuitry and said storage location are coupled to the end-user device, said end-user device receives said first conditioned signal from said first sensor output and said stored predetermined sensor specific correction coefficients from a second sensor output; and said end-user device performs said second correction on said first conditioned signal using said stored predetermined sensor specific correction coefficients.

25. A sensor apparatus of claim 22, wherein comprising: a first sensor transducer sensing a first parameter and outputting a first raw signal corresponding to said sensed first parameter;

signal conditioning circuitry configured to receive said first raw signal that is output from said first sensor transducer, perform a first correction on said first raw signal to produce a first conditioned signal, and output said first conditioned signal via a first sensor output;

a storage location configured to store predetermined sensor specific correction coefficients for use in performing a second correction on said first conditioned signal that is output from said signal conditioning circuitry;

the storage location provides the predetermined sensor specific correction coefficients to a coefficient output of the sensor apparatus, wherein an end-user device receives the stored predetermined sensor specific correction coefficients from the coefficient output of the sensor apparatus as well as the first conditioned signal from the first sensor output, and performs the second correction on said first conditioned signal.

* * * * *